United States Patent
Numata et al.

(10) Patent No.: US 7,335,444 B2
(45) Date of Patent: Feb. 26, 2008

(54) POSITIVE ELECTRODE ACTIVE MATERIAL FOR A SECONDARY BATTERY, SECONDARY BATTERY AND PROCESS OF MANUFACTURING POSITIVE ELECTRODE ACTIVE MATERIAL FOR A SECONDARY BATTERY

(75) Inventors: Tatsuji Numata, Tokyo (JP); Yoshitada Tomioka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/237,163

(22) Filed: Sep. 28, 2005

(65) Prior Publication Data

US 2006/0019166 A1 Jan. 26, 2006

Related U.S. Application Data (63) Continuation of application No. PCT/JP2004/004639, filed on Mar. 31, 2004.

(30) Foreign Application Priority Data

Mar. 31, 2003 (JP) .............................. 2003-093501

(51) Int. Cl.
*H01M 4/02* (2006.01)
(52) U.S. Cl. .............. 429/209; 429/231.95; 429/218.1; 429/224; 429/231.3; 429/223

(58) Field of Classification Search ................ 429/209, 429/218.1, 223, 224, 231.3, 231.95
See application file for complete search history.

(56) References Cited

U.S. PATENT DOCUMENTS

2002/0055047 A1* 5/2002 Satoh et al. ................ 429/337

FOREIGN PATENT DOCUMENTS

| JP | 4-169077 | 6/1992 |
|----|----------|--------|
| JP | 5-036412 | 2/1993 |
| JP | 6-187993 | 7/1994 |
| JP | 8-050900 | 2/1996 |
| JP | 11-176421 | 7/1999 |
| JP | 2000-077071 | 3/2000 |
| JP | 2002-068745 | 3/2002 |
| WO | WO 98/26469 | 6/1998 |

OTHER PUBLICATIONS

International Search Report dated Jul. 27, 2004.

* cited by examiner

*Primary Examiner*—Jane Rhee
(74) *Attorney, Agent, or Firm*—Katten Muchin Rosenman LLP (57) ABSTRACT

A positive electrode active material containing lithium manganate having a spinel structure is used, wherein the value of $a^*$ of the $L^*a^*b^*$ color specification system is made to satisfy the requirement: $-3.2 \leq a^* \leq -1.4$. Or, the value of $a^*$ is made to satisfy the requirement: $-5.8 \, 23 \, a^* \leq -4.2$. Or, the value of $L^*$ is made to satisfy the requirement: $24 \leq L^* \leq 27$.

11 Claims, 4 Drawing Sheets

POSITIVE ELECTRODE ACTIVE MATERIAL FOR A SECONDARY BATTERY, SECONDARY BATTERY AND PROCESS OF MANUFACTURING POSITIVE ELECTRODE ACTIVE MATERIAL FOR A SECONDARY BATTERY

CROSS-REFERENCE TO RELATED APPLICATION

This application is a continuation of International Application PCT/JP2004/004639 filed on Mar. 31, 2004, pending at the time of filing of this continuation application, and claims priority from Japanese Patent Application 2003-093501 filed Mar. 31, 2003, the contents of which are herein wholly incorporated by reference.

TECHNICAL FIELD

The present invention relates to positive electrode active material for a secondary battery, a secondary battery and process of manufacturing positive electrode active material for a secondary battery.

BACKGROUND ART

Ten years or more have passed since a lithium ion secondary battery was manufactured as a commercial product for the first time. Rapid progress of portable devices have been made and these portable devices have spread since then. It is needless to say that the characteristics, such as high output and high energy density of the lithium ion secondary battery largely contributes to this background. $LiCoO_2$ is generally used as the positive electrode active material of this lithium ion secondary battery. $LiCoO_2$ exhibits a charge-discharge potential in the 4 V class in combination with a metal Li counter electrode, is synthesized relatively easily and is allowed to have a capacity of about 150 to 160 mAh/g. Therefore, this lithium battery is advantageous to constitute a battery having high energy density by using $LiCoO_2$. However, Co that is a structural element of $LiCoO_2$ is expensive. Also, this battery is not necessarily suitable to large-scale batteries used in the applications of HEV (hybrid car) assumed to be driven for a long term like 10 to 20 years in view of long-term reliability and easiness of mass-production.

In HEV applications, it is desired for battery to suppress a rise in battery resistance caused, particularly, by cycles and storage and improve high rate charge-discharge characteristics besides excellent charge-discharge cycle characteristics at high temperatures and excellent capacity retention properties at high temperatures which are the characteristics required for conventional batteries. Under this situation, new positive electrode materials that substitute for $LiCoO_2$ are sought in the fields where high rate characteristics and long-term reliability such as in applications of HEV are required and there are strict demands for low cost.

Studies are made as to practical use of $LiNiO_2$ type materials having a bedded salt structure and $LiMn_2O_4$ having a spinel structure as materials for small batteries in portable device applications. Among these materials, $LiNiO_2$ type materials have a charge-discharge capacity as large as 170 to 200 mAh/g though operating voltage is slightly lower than that of $LiCoO_2$, and it is therefore possible to decrease the cost per capacity. However, in order to use $LiNiO_2$ type materials safely, various suppression must be added, the material not necessarily reach the stage where it is regarded as a most promising one of next positive electrode active materials.

On the other hand, Li-containing complex oxides that are represented by $LiMn_2O_4$ and have a cubic system spinel structure are superior in high rate charge-discharge characteristics due to its crystal structure having a three-dimensional diffusing path of Li and are also highly safe and inexpensive due to the stability of $Mn^{4+}$. These Li-containing complex oxides are therefore expected as positive electrode active materials suitable in HEV applications.

However, $LiMn_2O_4$ is changed in characteristic more significantly under a high-temperature circumstance than other layer oxides and is therefore deteriorated in capacity with increased temperature due to charge-discharge cycles and storage.

The reason why $LiMn_2O_4$ is inferior to $LiCoO_2$ in charge-discharge cycle characteristics is usually said to be the Jahn-Teller strain caused by a plus trivalent Mn ion or the elution of Mn in an electrolytic solution from a lithium manganate crystal. In view of this situation, technologies of making a composition of excess Li, specifically, $Li_{1+x}Mn_{2-x}O_4$ and a method in which the Mn site is replaced with other elements and particularly with Cr are investigated (Japanese Patent Application Laid-Open (JP-A) Nos. 6-187993, 5-36412).

These technologies are oxygen octahedron as center on the Mn ion for making firm that basically bring the Mn value number balance in the manganese acid lithium close to +4 values. Therefore, the improvement in charge-discharge cycle characteristics which are made by using these technologies is confirmed experimentally. However, the improvement is not enough to meet the requirements for power storage and power source for electromobiles.

Also, methods in which the surface of $LiMn_2O_4$ is covered with other materials are investigated separately from the approach to the technologies by using the substitution with Li and other transition metal elements. Patent JP-A No. 2002-68745 discloses technologies for covering the surface of Al-substitution type $LiMn_{2-y}Al_yO_4$ with Li-excess type $Li_{1+x}Mn_{2-x}O_4$.

However, the technologies for covering the surface of $LiMn_2O_4$ are measures taken to select a chemically, thermally or electrochemically stable material and therefore, serve to hinder Li from going in or out through the interface between the positive active material and the electrolytic solution as viewed from a new angle. For this, these technologies are unnecessarily measures suitable to attain high-rate discharge characteristics.

In view of this situation, as a further measures taken to approach to the subject, a trial is made to improve charge-discharge cycle characteristics or capacity retention properties by adding other materials in a battery or an electrode instead of improving the crystal structure itself of lithium manganate and covering the surface of a crystal (JP-A No. 2001-506052). On the assumption that the reason of the deterioration of lithium manganate is the acid produced in an electrolytic solution and phenomena caused by the acid such as dissolution of lithium manganate and decomposition of an electrolytic solution and supporting salt, the technologies described in patent reference intends consciously to prevent a deterioration in battery characteristics by suppressing the above phenomena and the like. Though this method has a certain effect on the improvement in battery characteristics in the case of assuming that it is applied to a power source for small portable devices, this method is unsatisfactory in light of suppression on a change in the internal resistance of a battery when assuming that it is used in HEV applications. Therefore a further improvement was needed in the battery of HEV applications.

On the other hand, a method using colorimetry is proposed when the quality of a battery is controlled (JP-A No. 8-50900). The characteristics of the color of a positive electrode active material is considered to reflect the characteristics such as its structure. However, in JP-A No. 8-50900, a calorimetric value is used only for discriminating between a nondefective and a defective, and this method is not based on the idea intending to improve the characteristics of a battery by utilizing the color characteristics of a product from the stage of a product design.

DISCLOSURE OF THE INVENTION

As mentioned above, particularly high-rate charge-discharge characteristics are demanded for batteries used in HEV applications. Therefore it is required for batteries to have a low resistance and to be reduced variation width in resistance over a long term. Because no study have been made in view of this in conventional technologies, the breadth of rising in the resistance of a battery which is caused by a long term cycle or long-term storage is too large to satisfy the requirements of batteries used in HEV applications and power storage applications.

The present invention has been made in the above situation and it is an object of the present invention to provide technologies for extending the life of a secondary battery. Also, another object of the present invention is to provide technologies for suppressing a rise in resistance when a secondary battery is stored at high temperatures.

The inventors have examined in a secondary battery to use a lithium manganese complex oxide as a positive electrode for the purpose of supressing a battery resistance rise for a long term. The inventors reached this invention as a result of it. The inventors of the present invention have examined as to lithium manganate having a cubic spinel structure by focusing attention to a change in the internal resistance of a battery which is caused by the following many factors to influence charge-discharge cycle characteristics when the battery is stored for a fixed time.

(a) Synthetic process condition (e.g., choice of raw material, mixing method, firing temperature, firing profile and cooling rate).

(b) Atomic composition (e.g., Li/Mn ratio and substitution with other elements).

(c) Powder characteristics (e.g., particle diameter, specific surface area, lattice constant, half value width of a specific peak in an X-ray diffraction method and content of impurities). As a result, it has been confirmed that factors which are said to be effective to improve the charge-discharge cycle characteristics are not necessarily effective to suppress a change in internal resistance before and after the battery is stored when each factor is singly used.

For example, the tendency that charge-discharge cycle characteristic and capacity retention properties almost improve is recognized, although charge-discharge capacity falls when Li/Mn ratio is increased. However, a change in internal resistance before and after storage is not necessarily suppressed. The same may be said of lattice constant, specific surface area and substitution with other elements. A change in internal resistance before and after a battery is stored is not necessarily suppressed by controlling lattice constant and specific surface area or by selecting other elements and substituting with selected elements to improve charge-discharge characteristics and capacity retention properties.

In view of this situation, the inventors of the present invention have investigated and rearranged various experimental results in detail and as a result, found that lithium manganate suppressed in a rise of the internal resistance of a battery which is caused by storage have the following common point.

In other words, it has been clarified for the first time that lithium manganate which is considered to have the effect of suppressing a rise in the internal resistance of a battery which is caused by storage, each parameter of $L^*$, $a^*$ and $b^*$ of the $L^*a^*b^*$ color specification system falls in the range which will be explained later. The use of lithium manganate having such characteristics as a positive electrode active material make it possible to suppress a increase of breadth of rising in internal resistance reliably also when a secondary battery is stored at high temperatures.

Conventionally, it was examined an evaluation method to select by color characteristics with a product. However, this method did not have idea to let a product design reflect it by studing a cause of a difference of a color characteristic and. The aforementioned JP-A No. 8-50900 is also a check method using colorimetric value strictly. In the present invention, on the contrary, it is possible to obtain a positive electrode active material having excellent characteristics stably by using color characteristics for the design of a positive electrode active material.

In the meantime, it is difficult to obtain the positive electrode active material having predetermined color characteristics found in the present invention by conventional production methods. In the present invention, it is further found that in the production of the positive electrode active material, it is possible to produce a positive electrode active material having a specified color characteristics by selecting and using starting material having a specified color characteristics and by firing the material according to a specified firing condition.

The invention provides a positive electrode active material for secondary battery which has a spinel structure that allows electrochemical insertion and extraction of lithium and contains lithium manganate in which the value of $a^*$ of the $L^*a^*b^*$ color specification system is $-3.2 \leq a^* \leq -1.4$.

The invention provides a positive electrode active material for secondary battery which has a spinel structure that allows electrochemical insertion and extraction of lithium and contains lithium manganate in which the value of $b^*$ of the $L^*a^*b^*$ color specification system is $-5.8 \leq b^* \leq -4.2$.

The invention provides a positive electrode active material for secondary battery which has a spinel structure that allows electrochemical insertion and extraction of lithium and contains lithium manganate in which the value of $L^*$ of the $L^*a^*b^*$ color specification system is $24 \leq L^* \leq 27$.

The "lithium manganate" in this specification contains a compound in which the Mn site or the O site is substituted with other elements to the extent that the compound has the same spinel structure as $LiMn_2O_4$.

The $L^*a^*b^*$ color specification system used as an indicator showing the characteristics of lithium manganate in the present invention is a color space which is recommended by CIE (Commission Internationale del'Eclairage) and has perceptually almost equal rates and called CIE 1976 ($L^*a^*b^*$ color space). This color specification system is predetermined in JIS Z 8729. A battery using lithium manganate satisfying at least one of the following requirements: $-3.2 \leq a^* \leq -1.4$, $-5.8 \leq b^* \leq -4.2$ and $24 \leq L^* \leq 27$ as the positive electrode active material is suppressed in a rise of internal resistance, after a battery is stored at high temperatures, more significantly than batteries using lithium manganate having the parameter out of the above range. It is preferable that the following requirements be satisfied: $-2.8 \leq a^* \leq -1.8$ and $-5.6 \leq b^* \leq -4.5$. This can suppress a rise in the resistance of a battery more exactly. Furthermore, it is possible to suppress a resistance rise of a battery still more by using lithium manganate satisfying the following requirements: $-2.8 \leq a^* \leq -1.8$, $-5.6 \leq b^* \leq -4.5$ and $24 \leq L^* \leq 27$.

As to the relation between the color of lithium manganate and a rise in the internal resistance of a battery, its exact mechanism has not been clarified. However, because it is inferred that the color is affected by the distance between a metal ion and oxygen and surface condition, it is considered that each parameter of L*, a* and b* efficiently expresses the characteristic of lithium manganate.

In a process of manufacturing positive electrode active material for a secondary battery, one or two or more materials selected from the group consisting of electrolytic manganese dioxide, β-$MnO_2$, $Mn_2O_3$ and $Mn_3O_4$ may be used as the above Mn raw material and $Li_2CO_3$ may be used as the above Li raw material. In doing so, lithium manganate in which the value of each parameter of the L*a*b* color specification system satisfies any one of the above requirements can be obtained without fail.

In the positive electrode active material for a secondary battery of the present invention, the above lithium manganate may be a compound represented by the following formula (1) or may have a structure in which a part of the sites of Mn or O are substituted with other elements in the compound.

$$Li_{1+x}Mn_{2-x}O_4 \quad (1)$$

In the above formula (1), x satisfies the following condition: $0.12 \leq x \leq 0.18$. This can improve the charge-discharge characteristics of the secondary battery.

The secondary battery positive electrode active material of the present invention may further contain a compound represented by the following formula (2).

$$LiNi_{1-y}M_yO_2 \quad (2)$$

In the above formula (2), M is one or two or more materials selected from the group consisting of Co, Mn and Al and y satisfies the following condition: $0.1 < y < 0.5$. By this formulation, a rise in resistance when the secondary battery is stored can be more suppressed.

When the ratio by weight of the above lithium manganate to the compound represented by the above formula (2) is (100−α): α in the secondary battery positive electrode active material of the present invention, the secondary battery positive electrode active material may have a structure in which α is 20 or more and 70 or less. This can further suppress a rise in resistance when the battery is stored.

The present invention provides a secondary battery including the above positive electrode active material for secondary battery in second battery provided with at least a positive electrode and a negative electrode. The secondary battery according to the present invention contains lithium manganate in which each parameter L*, a* and b* of the L*a*b* color specification system satisfies any one of the above requirements in the positive electrode active material. For this, a rise in resistance can be suppressed without fail when the battery is stored at high temperatures.

According to the present invention, there is provided the process of manufacturing said positive electrode active material for a secondary battery, the process including a step of mixing a Mn raw material and a Li raw material and primarily firing and secondarily firing the mixture to obtain the above lithium manganate, wherein the value of L* of the L*a*b* color specification system of the above Mn raw material satisfies the condition $22 \leq L^* \leq 26$ and the above primary firing and secondary firing are carried out at temperatures of 450 degree C. or more and 950 degree C. or less.

According to the present invention, there is provided the process of manufacturing said positive electrode active material for a secondary battery, the process including a step of mixing a Mn raw material and a Li raw material and primarily firing and secondarily firing the mixture to obtain the above lithium manganate, wherein the value of a* of the L*a*b* color specification system of the above Mn raw material is $-1 \leq a^* \leq 2$ and the above primary firing and secondary firing are carried out at temperatures of 450 degree C. or more and 950 degree C. or less.

According to the present invention, there is provided the process of manufacturing the above secondary battery positive electrode active material, the process comprising a step of mixing a Mn raw material and a Li raw material and primarily firing and secondarily firing the mixture to obtain the above lithium manganate, wherein the value of b* of the L*a*b* color specification system of the above Mn raw material is $0 \leq b^* \leq 10$ and the above primary firing and secondary firing are carried out at temperatures of 450 degree C. or more and 950 degree C. or less wherein the above secondary firing is carried out at a lower temperature than the above primary firing.

In the present invention, a Mn raw material having L*, a* and b* like this is used to carry out a predetermined firing, whereby a positive electrode active material containing lithium manganate satisfying at least any one of the following requirements: $-3.2 \leq a^* \leq -1.4$, $-5.8 \leq b^* \leq -4.2$ and $24 \leq L^* \leq 27$ stably. In the case where the positive electrode active material contains a compound represented by the above formula (2), the compound represented by the formula (2) may be obtained by a well-known method used as a method of producing lithium nickelate or a compound obtained by substituting the Ni site of the above lithium nickelate.

In the process of manufacturing a positive electrode active material for secondary battery of the present invention, the above primary firing may be carried out at higher temperatures than the secondary firing. By this method, it can be surely produced the manganese acid lithium that each parameter of L*, a* and b* satisfies any one of the above requirements.

According to the present invention as mentioned above, the life of a secondary battery can be extended by using lithium manganate having a spinel structure as a positive electrode active material and by controlling the value of the chromaticity parameter of the above lithium manganate. Also, a rise in resistance when a secondary battery is stored at high temperatures can be suppressed.

BRIEF DESCRIPTION OF THE DRAWINGS

In the accompanying drawings, there are shown illustrative embodiments of the invention from which these other of its objectives, novel features, and advantages will be more apparent.

BEST MODE FOR CARRYING OUT THE INVENTION

Figure 1:
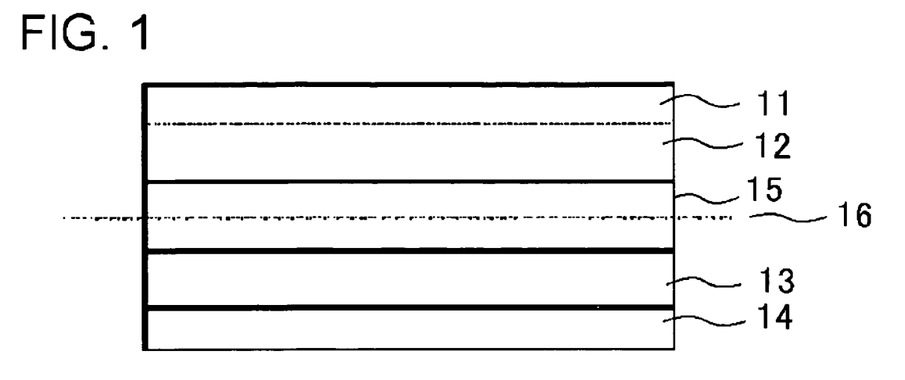
FIG. 1 is a view showing the structure of a secondary battery according to this embodiment.

Preferred embodiments of a secondary battery according to the present invention will be hereinafter explained. A battery according to this embodiment has a structure as shown in FIG. 1. FIG. 1 is a schematic enlarged cross-sectional view of a negative electrode collector of a secondary battery according to this embodiment in the direction of the thickness of the current collector. The positive electrode is produced by depositing a layer 12 containing a positive electrode active material under a positive electrode collector 11. The negative electrode is produced by depositing a layer 13 containing a negative electrode active material on a negative electrode collector 14. These positive electrode and negative electrode are disposed opposite to each other through an electrolytic solution 15 and a porous separator 16 in an electrolytic solution 15. The porous separator 16 is disposed almost in parallel to the layer 13 containing the negative electrode active material.

The positive electrode active material used in the layer 12 containing the positive electrode active material is selected from Li-containing complex oxides having an average discharge potential in the vicinity of 4 V for a Li metal. Particularly, a compound represented by the following formula (1) is preferably used as lithium manganate.

$$Li_{1+x}Mn_{2-x}O_4 \quad (1)$$

wherein x satisfies the following condition: $0.12 \leq x \leq 0.18$.

Also, the Mn site may be substituted with other cations and the O site may be substituted with other anions optionally depending on the order of priority of various characteristics of an intended battery.

Further, in addition to the compound represented by the formula (1), a Li-containing bedded oxide is preferably contained. The Li-containing bedded oxide may be a compound represented by the following formula (2).

$$LiNi_{1-y}Mn_yO_2 \quad (2)$$

wherein M represents one or two or more materials selected from the group consisting of Co, Mn and Al and y satisfies the following condition: $0.1 < y < 0.5$.

The resistance rise of the battery can be suppressed more effectively by containing the compound represented by the formula (2). The compound represented by the formula (2) may be prepared by a well-known method used as a method of producing lithium nickelate. For example, the compound represented by the formula (2) may be prepared by mixing a Li raw material with a Ni raw material and by firing the mixture at a predetermined temperature. Also, the compound in which the Ni site is substituted may be prepared by using, as starting material, a Ni raw material in which the Ni site is substituted.

When the ratio by weight of the above lithium-containing complex oxide represented by the formula (1) to the Li-containing bedded oxide is (100−α): α, it is possible that the value of a is, for example, 20 or more and 70 or less. When the value of α is 20 or more, a rise in resistance can be suppressed reliably. The value of α is more preferably 30 or more. Also, when the value of α is 70 or less, excellent charge-discharge characteristics can be secured. The value of α is more preferably 50 or less.

No particular limitation is imposed on the particle shape of the positive electrode active material, and the positive electrode active material may have a shape such as a block form, sphere form and plate form. Also, the particle diameter or specific surface area of the positive electrode active material particle may be properly selected in consideration of the film thickness of the positive electrode, the electrode density of the positive electrode and the type of a binder. In order to keep high energy density, it is preferable to select appropriate characteristics such as a particle shape, grain distribution, average particle diameter, specific surface area or true density such that the electrode density of the positive electrode at the part where a metal foil which is the positive electrode collector 11 is removed is 2.4 g/mL or more. Also, the layer 12 containing the positive electrode active material is constituted of, for example, a positive electrode active material, a binder and a conductivity imparting agent. It is preferable to select appropriate characteristics such as a particle shape, particle distribution, average particle diameter, specific surface area and true density such that the ratio by weight of the positive electrode active material is 80% or more.

In this embodiment, it is possible to suppress a rise in the internal resistance of the battery which is caused by storing the battery at high temperatures properly by using, as the positive electrode active material, lithium manganate in which each calorimetric value in the L*a*b* color specification system satisfies any one of the following requirements:

(i) $-3.2 \leq a^* \leq -1.4$;
(ii) $-5.8 \leq b^* \leq -4.2$; and
(iii) $24 \leq L^* \leq 27$ Particularly, a rise in the internal resistance of the battery can be suppressed without fail by using lithium manganate satisfying the following requirement: $-2.8 \leq a^* \leq 1.8$ or $-5.6 \leq b^* \leq -4.5$. Further, a rise in the internal resistance of the battery can be more suppressed without fail by using a positive electrode active material satisfying all the following requirements: $-2.8 \leq a^* \leq -1.8$, $-5.6 \leq b^* \leq -4.5$ and $24 \leq L^* \leq 27$.

Next, the synthesis of lithium manganate represented by the above formula (1) is explained. As starting material used for the synthesis, $Li_2CO_3$, LiOH. $Li_2O$, $Li_2SO_4$ or the like may be used as a Li source and $MnO_2$, $Mn_2O_3$, $Mn_3O_4$, MnOOH, $MnCO_3$, $Mn(NO_3)_2$ or the like may be used as a Mn source. Among these compounds, $Li_2CO_3$ is preferable as the Li source and $MnO_2$, $Mn_2O_3$ or $Mn_3O_4$ is particularly preferable as the Mn source from the viewpoint of costs and handling easiness and also from the viewpoint of obtaining an active material which has high packing density with ease.

In general, using the Li source and Mn source as starting materials, these starting materials are weighed and mixed with each other such that a predetermined metal composition ratio is obtained when lithium manganate is produced. At this time, the particle diameter of each regent is preferably made to be 10 Ξm or less to avoid the presence of a residual substance of a $Mn_2O_3$ different phase. The mixing is carried out using, for example, a ball mill, V-type mixer, cutter mixer or shaker. An appropriate device may be optionally selected according to the particle diameter or hardness of selected reagents. The resulting mixed powder is fired at a temperature range from 600 degree C. to 950 degree C. in air or oxygen.

However, it is difficult to produce the positive electrode active material which satisfies at least one of the above (i) to (iii) by using the above conventional method. For this, in this embodiment, only a compound having a calorimetric value falling in the range of a certain condition is selected and used as Mn source. Further, a firing condition corresponding to the selected raw material is selected to carry out firing in two stages. By this method, it is possible to obtain a positive electrode active material satisfying at least one of the above (i) to (iii) for the first time. It is to be noted that more detailed explanations will be explained as to the selection of the raw material and the selection of firing condition when the positive electrode active material according to this embodiment is prepared by comparing the selection with those of a conventional production method in the examples described later.

The specific surface area of lithium manganate obtained by selecting a predetermined raw material and condition in this manner is designed to be preferably 1.5 $m^2/g$ or less and particularly preferably 0.8 $m^2/g$ or less. By this measures, the amount of a binder to be added can be reduced. Therefore, the energy density of the battery can be improved.

The electrode is manufactured by mixing obtained positive electrode active material with a binder specie and a conductivity imparting agent. An appropriate material is selected as the binder material from usually used materials according to the characteristics regarded as important for batteries such as rate characteristics, low-temperature discharge characteristics, pulse discharge characteristics, energy density and the level of light-weight or the level of micronization. For example, a resin type binding agent such as polyvinylidene fluoride (PVDF) and polytetrafluoroethylene (PTFE) may be used. It is to be noted that an Al foil is preferably used as the positive electrode collector 11.

The negative electrode active material used in the layer 13 containing the negative electrode active material is preferably selected from a Li metal, Li alloys and carbon materials which can insert and dissociate a Li ion. Also, The negative electrode active material may be a metal or a metal oxide which is alloyed with Li, or complex materials of these metal or metal oxide and carbon materials, or transition metal nitrides. As to the selection of the negative electrode material, it is particularly preferable to use amorphous carbon when it is used in applications requiring high output of the capacitance of a battery and when regarding high-temperature characteristics as important.

The electrode is manufactured by mixing obtained negative electrode active material with a binder specie. The negative electrode active material is mixed with a binder material to make an electrode. As the binder, materials used as the binder of a positive electrode may be used and rubber type binders may also be used. A Cu foil may be preferably used as the negative electrode collector 14.

The solvent used for the electrolytic solution 15 may be selected from solvents which are usually used as the non-protonic solvent. For example, cyclic carbonates, chain carbonates, aliphatic carboxylate esters, hydrocarbon chlorides, cyclic ethers, chain ethers, ketones and nitrites may be used. To describe in more detail, it is preferable that at least one type be selected from ethylene carbonate (EC), propylene carbonate (PC), γ-butyrolactone (GBL) and the like as a high dielectric solvent, at least one type be selected from diethyl carbonate (DEC), dimethyl carbonate (DMC), ethyl methyl carbonate (EMC), esters and the like as a low-viscosity solvent and the both be mixed to prepare a mixed solution which is used as the solvent. Such a mixed solution, a mixed solvent such as EC/DEC, PC/DMC, PC/EMD or PC/EC/DEC is preferable. Also, when the purity of the solvent is low and water content is large, it is preferable to raise the mixing ratio of a solvent of the kind having a potential window wider toward the high-potential side. Further, a small amount of additives may be added for the purpose of consuming water, improving oxidation resistance and improving safety.

As the supporting salt in the electrolytic solution 15, one ore more types selected from $LiBF_4$, $LiPF_6$, $LiClO_4$, $LiAsF_6$, $LiSbF_6$, $LiCF_3SO_3$, $Li(CF_3SO_2)N$, $LiC_4F_9SO_3$, $Li(CF_3SO_2)_3C$, $Li(C_2F_5SO_3)_2N$ and the like may be used. Particularly, a system containing $LiPF_6$ is preferable. When $LiPF_6$ is used, electroconductivity of a lithium salt can be raised, which further improves the cycle characteristics of the secondary battery. The concentration of the supporting salt in the electrolytic solution 15 is designed to be, for example, 0.8 M to 1.5 M and preferably 0.9 M to 1.2 M.

Although no particular limitation is imposed on the material of the porous separator 16, woven cloth, glass woven fabric and porous synthetic resin films or the like may be used. For example, porous film types including polyolefins such as polypropylene and polyethylene and fluororesins may be used. These films are preferably used in the point that they are thin films, and have a large area, film strength and film resistance.

As to the secondary battery of FIG. 1, in a dry air or inert gas atmosphere, a negative electrode and a positive electrode are stacked through the porous separator 16 or the stacked one is rolled, then the resulting laminate is stored in a battery can or an outer package body (not shown) such as a flexible film including a laminate of a synthetic resin and a metal foil and the packaged product is impregnated with the electrolytic solution 15, followed by sealing the laminate outer package.

Also, there is no particular limitation to the shape of the secondary battery according to this embodiment. However, for example, various shapes such as an angular form, paper form, laminate form, cylinder form, coin form and laminate outer package form may be adopted. No particular limitation is imposed on the outer package material and other structural members and these materials may be selected according to the shape of the battery.

The positive electrode active material and secondary battery obtained in this embodiment may be used particularly in HEV applications. Also, the secondary battery having such excellent characteristics is not limited to a spread to the fields of load leveling and backup system but brings about a development of high-performance mobile power source and can therefore greatly contributes to a clean energy society.

The present invention being thus described based on embodiments, these embodiments are illustrative and it will be obvious to those skilled in the art that each structural element and a combination of each treating process may be variously modified and such variations are within the scope of the present invention.

The present invention will be explained in more detail by way of examples which, are, however, not intended to be limiting of the present invention.

EXAMPLES (Synthesis of $Li_{1+x}Mn_{2-x}O_4$)

In this embodiment, $Li_{1+x}Mn_{2-x}O_4$ was used as lithium manganate and synthesized in the following manner.

A Li raw material and a Mn raw material were mixed with each other in a predetermined Li/Mn ratio. This mixed powder was subjected to primary firing carried out at a predetermined temperature ranging from 650 to 900 degree C. in the atmosphere of flowing dry air and then subjected again to secondary firing carried out at a temperature ranging from 450 to 900 degree C. in the atmosphere of flowing dry air.

Next, microparticles having a particle diameter of 1 μm or less in particles of the obtained $Li_{1+x}Mn_{2-x}O_4$ were removed by an air classifier. At this time, the resulting $Li_{1+x}Mn_{2-x}O_4$ had such powder characteristics that the specific surface area was 0.6 to 0.9 $m^2/g$ and the true density was 3.98 to 4.13 g/ml.

(Method of Measuring the Parameters of the L*a*b* Color Specification System)

A small whiteness meter NW-1 manufactured by Nippon Denshoku Industries Co., Ltd. was used to measure each value in the L*a*b* color specification system (JIS Z 8729) and a sintered product of a mixture of borosilicate glass and a light-dispersion material was used as the standard white plate for correction. The sample was placed in a 10 mmϕ glass cell to measure nine times under the condition of vertical illumination-45° circumferential illumination and an average of the nine values was L*, a* and b* of each sample. This is substantially the same as a method in which data is arranged using ΔL*, Δa* and Δb* as relative values to the standard white plate or a molded article of a barium sulfate powder.

(Production of a Battery)

The lithium manganate was synthesized by using the raw material in the following Tables 1 to 5. In Tables 1 to 5, the "BATTERY ID" indicates the produced battery sample ID. Also, the "RAW MATERIAL ID" indicates ID of the Mn raw material and those represent L*, a* and b* of each Mn raw material are "RAW MATERIAL L*", "RAW MATERIAL a*" and "RAW MATERIAL b*" respectively. These values were measured by using the above methods. Also, in Tables 1 and 2 and Tables 6 and 7 which will be explained later, the "EMD" indicates electrolytic manganese dioxide. Also, in all the samples of battery ID, $Li_2CO_3$ was used as the Li raw material of the positive electrode active material.

L*, a* and b* of the resulting lithium manganate were measured by the aforementioned method. The results of measurement are shown in Tables 6 to 10. In Tables 6 to 10, the "PRODUCT L*", the "PRODUCT a*" and the "PRODUCT b*" indicate L*, a* and b* of each lithium manganate respectively. Then, these lithium manganate as the positive electrode active material were used to manufacture a 18650 cylinder battery. First, the positive electrode active material and a conductivity imparting agent were mixed in a dry system and the mixture was dispersed uniformly in N-methyl-2-pyrrolidone (NMP) in which PVDF as a binder is dissolved to prepare a slurry. Graphite having an average particle diameter of 5 μm was used as the conductivity imparting agent. After the slurry was applied to an aluminum metal foil of 25 μm in thickness, NMP was vaporized to form a positive electrode sheet. The ratio of solid contents in the positive electrode was designed to be as follows: positive electrode active material: conductivity imparting agent: PVDF=80:10:10 (wt %).

On the other hand, the negative electrode sheet was prepared by mixing hard carbon with PVDF in the following ratio: hard carbon:PVDF=90:10 (wt %) and by dispersing the mixture in NMP, which was then applied to a copper foil 20 μm in thickness.

The electrodes sheets for the positive electrode and negative electrode which were prepared in the described above process were coiled through a polyethylene porous separator of 25 μm in thickness to prepare a cylinder battery.

The electrolytic solution was prepared using 1 M $LiPF_6$ as the supporting salt, and a mixed solution of ethylene carbonate (EC) and diethyl carbonate (DEC) was used as the solvent. The mixing ratio was designed to be as follows: EC:DEC=30:70 (vol %).

Also, a positive electrode containing $LiNi_{0.8}Co_{0.2}O_2$ besides the above lithium manganate was used to prepare an 18650 cylinder battery. At this time, the content of $LiNi_{0.8}Co_{0.2}O_2$ was designed to be equal to the "AMOUNT OF Ni TO BE MIXED" in Tables 1 to 5 when the total amount of lithium manganate and $LiNi_{0.8}Co_{0.2}O_2$ in the positive electrode was set to 100. Also, the mixed ratio of $LiNi_{0.8}Co_{0.2}O_2$ to other materials was designed to be as follows: (lithium manganate+$LiNi_{0.8}Co_{0.2}O_2$): conductivity imparting agent: PVDF=80:10:10. The structures of parts other than a positive electrode such as a negative electrode and an electrolytic solution were made to be the same as those of the above battery.

(Evaluation)

With respect to the secondary batteries prepared using the positive electrode active materials produced in the conditions shown in Tables 1 to 5, rated capacitance and internal resistances in the initial stage and after the battery was stored were measured.

(A) Measurement of Rated Capacitance

First, each battery after trial production was charged to 4.2 V under a current of 700 mA and then charged for 2 hours at a constant voltage. In succession, the battery was discharged at a constant current until the voltage was dropped to 3.0 V under a current of 100 mA and the capacitance obtained at this time was defined as the rated capacitance of each battery. Thereafter, the battery was charged until the voltage was raised to 4.2 V under a current of 700 mA for aging, and the battery was allowed to stand at 25 degree C. for one week. Then the discharge until the voltage was dropped to 3.0 V under a current of 100 mA was performed.

(B) Determination of Initial Internal Direct Current Resistance

Each battery that had been subjected to the above treatment (A) was charged under a constant current of 700 mA until the voltage was raised to 4.2 V and after the voltage of the battery reached 4.2 V, the battery was charged for 2 hours at a constant voltage. The charged battery was discharged under a current of 160 to 90 mA (equivalent to 0.2 C of each battery) to a predetermined depth of discharge (DOD) and then, the voltage when the battery was discharged at 1 C rate for 10 seconds was measured. After allowing to stand it for 10 min, it was charged at a 1 C rate current for 10 sec, at the end of which a voltage was determined. After leaving it for further 10 min, it was discharged at 3 C for 10 sec, at the end of which a voltage was determined. Again, after leaving it for 10 min, it was charged at 3 C for 10 sec, at the end of which a voltage was determined. Subsequently, with a standing period of 10 min, similar measurement was repeated with charge-discharge rates of 5 C and 7 C to obtain a V-I curve, whose slope was defined as an initial internal DC resistance.

(C) Determination of Post-Storage Internal Direct Current Resistance

Each battery whose initial internal direct current resistance was measured by the above method was adjusted to the state of 50% DOD at a current equivalent to 0.2 C of each battery and then stored in a thermostatic oven at 55 degree C. for 4 weeks. After that, the V-I curve was found in the same method as in the measurement of the initial internal direct current. resistance and the slope of the line was defined as post-storage internal direct current.

(Results)

Tables 6 to 10 show the calorimetric value of each of the positive electrode active material obtained by firing the Mn raw materials having the raw materials ID described in Tables 1 to 5 in the firing conditions shown in the tables and the rate of a rise in the resistance of the battery produced using each positive electrode active material. In Tables 6 to 10;

Rate of rise in the resistance of a battery=(Post-storage internal direct current resistance)/(Initial internal direct current resistance).

FIGS. 2 to 5 show graphs obtained by arranging the relation between each measured value of $a^*$, $b^*$ and $L^*$ and the rate of a rise in the resistance of a battery in Tables 6 to 10. In FIGS. 2 to 5, a battery having a resistance rise rate of 1.8 or less is indicated by an open circle and a battery having a resistance rise rate of 1.8 or more is indicated by a filled circle.

Figure 2:
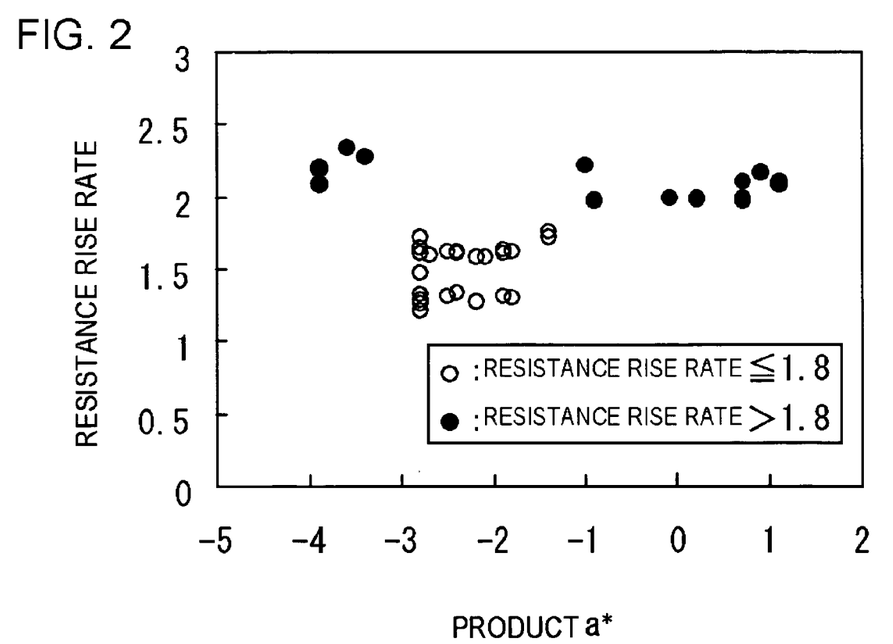
FIG. 2 is a view showing the relation between the colorimetric value of lithium manganate and a rise in the resistance of a battery in the secondary battery according to an example.
Figure 3:
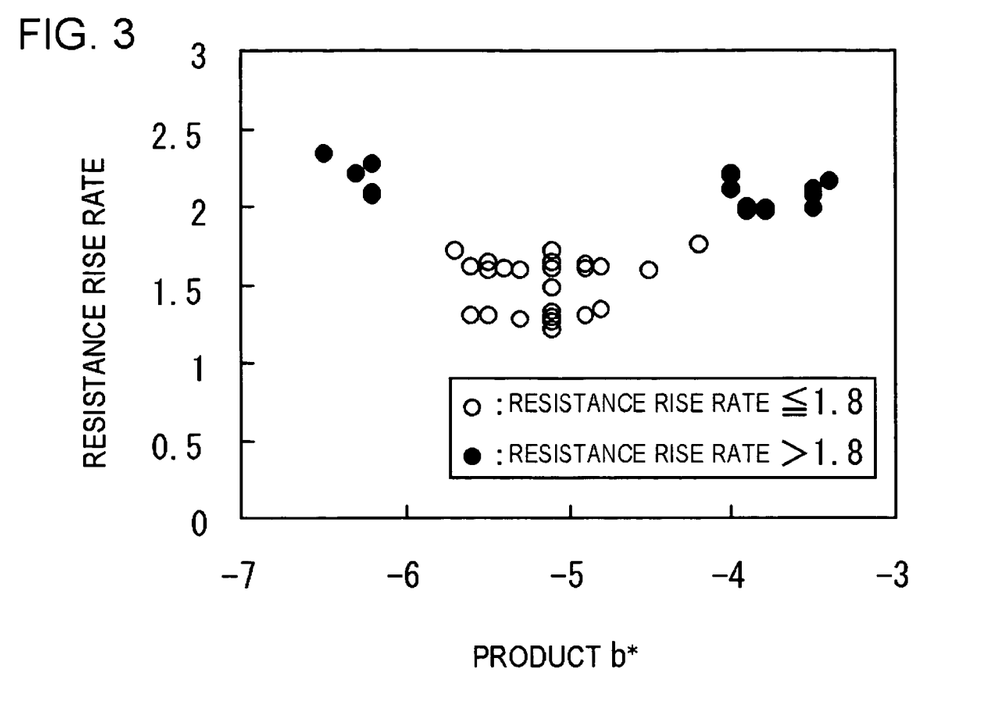
FIG. 3 is a view showing the relation between the colorimetric value of lithium manganate and a rise in the resistance of a battery in the secondary battery according to an example.
Figure 4:
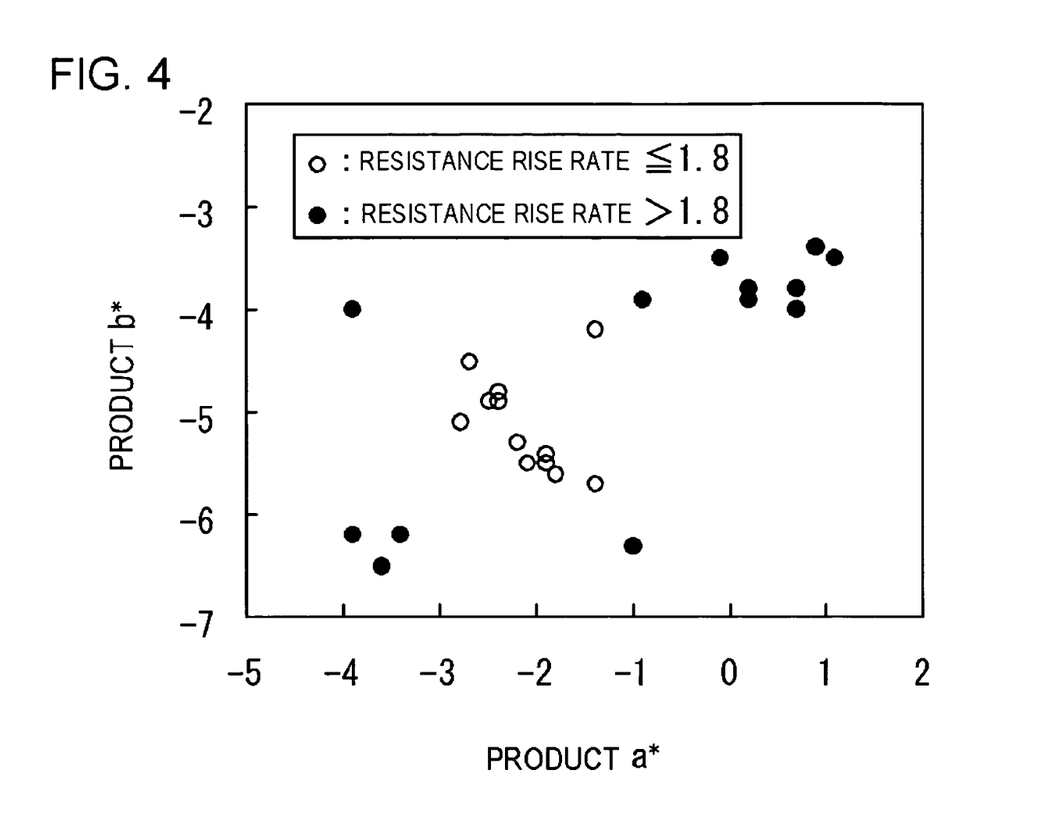
FIG. 4 is a view showing the relation between the colorimetric value of lithium manganate and a rise in the resistance of a battery in the secondary battery according to an example.
Figure 5:
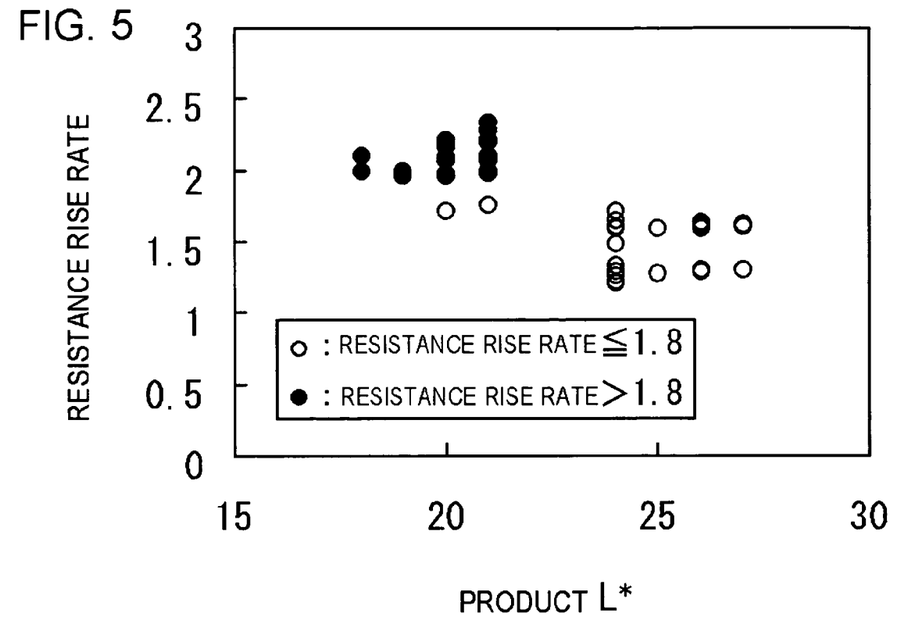
FIG. 5 is a view showing the relation between the colorimetric value of lithium manganate and a rise in the resistance of a battery in the secondary battery according to an example.

It is found to be able to suppress the resistance rise of the battery as an open circle shown from FIG. 2 to FIG. 4 by using the lithium manganate that is satisfy the following requirement: $-3.2 \leq a^* \leq -1.4$ and particularly $-2.8 \leq a^* \leq -1.8$ as a positive electrode active material, when the battery is stored at 55 degree C. for 4 weeks. It is found that a rise in the resistance of a battery can also be suppressed when lithium manganate satisfies the following requirement: $5.8 \leq b^* \leq -4.2$ and particularly $-5.6 \leq b^* \leq -4.5$. It is found that a rise in the resistance of a battery can also be suppressed when lithium manganate satisfies the following requirement: $24 \leq L^* \leq 27$.

Also, batteries that satisfied the above requirement in respect to any one of $a^*$, $b^*$ and $L^*$, specifically, batteries indicated by an open circle in FIGS. 2 to 5 correspond to batteries ID having the head character of A, C or E. On the other hand, batteries ID having the head character of B or D did not satisfy all the requirements and were increased in the rate of a rise of the resistance of the battery.

In the case of the batteries ID having the head character A, C or E, the Mn raw material for a positive electrode active material was selected such that the calorimetric value thereof had the value shown in Tables 1 to 5. Also, as to the firing temperature, the primary firing was carried out at higher temperature than the secondary firing and also, the firing temperature was selected corresponding to the Mn raw material.

Specifically, a compound satisfying the following requirement was selected as the Mn raw material from the results of Tables 1 to 10.

(I) $22 \leq L^* \leq 26$ (II) $-1 \leq a^* \leq 2$ (III) $0 \leq b^* \leq 10$

Anyone of the above requirements was selected and the condition of firing was properly selected, to obtain lithium manganate satisfying any one of the following requirements: $-3.2 \leq a^* \leq -1.4$, $5.8 \leq b^* \leq -4.2$ or $24 \leq L^* \leq 27$.

A positive electrode active material suppressing a rise in the resistance of a battery could be obtained by selecting the raw material and by designing the synthetic condition in the above manner.

Even if lithium manganate was synthesized under the same condition including the Mn raw material, percentage composition, primary firing temperature and secondary firing temperature as in the case of the battery ID satisfying the following requirement: $-3.2 \leq a^* \leq -1.4$, $5.8 \leq b^* \leq -4.2$ or $24 \leq L^* \leq 27$, $a^*$ unnecessarily satisfied the requirement: $-3.2 \leq a^* \leq -1.4$ in prescribed cases, so that it was not found that a rise in the internal resistance of the battery was suppressed. Above prescribed cases correspond to case of using a different firing furnace, specifically, case of being different of ratio between the flow rate of dry air and the volume of the furnace, and the temperature rise rate or temperature drop rate. Therefore the following fact was found: it is more important that $a^*$, $b^*$ or $L^*$ of lithium manganate after it is synthesized respectively fall in a specific range than that an individual parameter such as the raw material, composition and firing temperature fall in a specific range.

It was also possible to further drop the rate of a rise in resistance after the battery was stored by mixing lithium manganate satisfying the following requirements: $-3.2 \leq a^* \leq -1.4$, $5.8 \leq b^* \leq -4.2$ or $24 \leq L^* \leq 27$, with $LiNi_{0.8}Co_{0.2}O_2$ to use the resulting product as the positive electrode. This corresponds to the case of the battery ID with the head character being C or E in Tables 1 to 10.

Even if $LiNi_{0.8}Co_{0.2}O_2$ was mixed with lithium manganate that unsatisfied all the requirements: $-3.2 \leq a^* \leq -1.4$, $5.8 \leq b^* \leq -4.2$ or $24 \leq L^* \leq 27$, almost no effect on suppression to the rate of a rise in resistance after the battery was stored was confirmed. This result is understood from the result of the battery ID with the head character D. Therefore, it was found that a suppression to resistance rise rate could be attained only when lithium manganate having any one of the above calorimetric values and the addition of $LiNi_{0.8}Co_{0.2}O_2$ further promoted its effect.

It is also found that when lithium manganate satisfying the following requirements: $-3.2 \leq a^* \leq -1.4$, $5.8 \leq b^* \leq -4.2$ or $24 \leq L^* \leq 27$, is mixed with $LiNi_{0.8}Co_{0.2}O_2$ to use the resulting product as the positive electrode active material, the rate of a rise in the resistance of the battery is efficiently suppressed by controlling the ratio by weight of $LiNi_{0.8}Co_{0.2}O_2$ in the positive electrode active material to 20% or more and 70% or less. It is also found that when the ratio is, particularly, from 20% to 50%, this is more effective on suppression to a rise in resistance.

Although the detailed mechanism of this phenomenon has not been clarified, it is, for instance, inferred that when the ratio by weight of $LiNi_{0.8}Co_{0.2}O_2$ is relatively small, the basicity of $LiNi_{0.8}Co_{0.2}O_2$ acts effectively on the deterioration of lithium manganate whereas when the ratio by weight of $LiNi_{0.8}Co_{0.2}O_2$ is dominant, the basicity of $LiNi_{0.8}Co_{0.2}O_2$ decreases the effect of the electrolytic solution.

It was also confirmed that the rate a rise in resistance was likewise suppressed in the case where a positive electrode is prepared by $LiNiO_2$, $LiNi_{0.9}Co_{0.1}O_2$, $LiNi_{0.8}Co_{0.15}Al_{0.05}O_2$, $LiNi_{0.8}Co_{0.18}Mn_{0.02}O_2$ or $LiNi_{0.5}Mn_{0.5}O_2$ was mixed in place of $LiNi_{0.8}Co_{0.2}O_2$ as lithium manganate satisfying the following requirements: $-3.2 \leq a^* \leq -1.4$, $5.8 \leq b^* \leq -4.2$ or $24 \leq L^* \leq 27$.

It was also confirmed in the above examples, that each chromaticity parameter of lithium manganate after firing was almost equal to each chromaticity parameter of lithium manganate taken out when a battery is dismantled just after the battery is structured.

TABLE 1

| BUTTERY ID | RAW MATERIAL ID | Mn RAW MATERIAL | RAW MATERIAL L* | RAW MATERIAL a* | RAW MATERIAL b* | xIN $Li_{1+x}Mn_{2-x}O_4$ | PRIMARY FIRING TEMPERATURE (° C.) | SECONDARY FIRING TEMPERATURE (° C.) | AMOUNT OF Ni TO BE MIXED |
|---|---|---|---|---|---|---|---|---|---|
| A-2 | a-2 | EMD (NEWTRALIZATION BY AMMONIA) | 23.7 | 0.1 | 1.4 | 0.14 | 840 | 600 | 0 |
| A-3 | a-3 | EMD (NEWTRALIZATION BY AMMONIA) | 23.7 | −0.3 | 1.4 | 0.16 | 900 | 550 | 0 |
| A-11 | a-11 | EMD (NEWTRALIZATION BY AMMONIA) | 23.7 | −0.2 | 1.4 | 0.14 | 840 | 600 | 0 |
| B-3 | b-3 | EMD (NEWTRALIZATION BY AMMONIA) | 18.2 | 0.2 | 1.7 | 0.12 | 700 | 900 | 0 |
| B-9 | b-9 | EMD (NEWTRALIZATION BY AMMONIA) | 18.1 | 0.4 | 1.3 | 0.12 | 780 | 900 | 0 |
| B-10 | b-10 | EMD (NEWTRALIZATION BY AMMONIA) | 18.0 | 1.2 | 1.4 | 0.14 | 780 | 780 | 0 |
| C-2 | a-2 | EMD (NEWTRALIZATION BY AMMONIA) | 23.7 | 0.1 | 1.4 | 0.14 | 840 | 600 | 20 |
| C-3 | a-3 | EMD (NEWTRALIZATION BY AMMONIA) | 23.7 | −0.3 | 1.4 | 0.16 | 900 | 550 | 20 |
| D-3 | b-3 | EMD (NEWTRALIZATION BY AMMONIA) | 18.3 | −0.3 | 1.5 | 0.12 | 700 | 900 | 20 |

TABLE 2

| BUTTERY ID | RAW MATERIAL ID | Mn RAW MATERIAL | RAW MATERIAL L* | RAW MATERIAL a* | RAW MATERIAL b* | xIN $Li_{1+x}Mn_{2-x}O_4$ | PRIMARY FIRING TEMPERATURE (° C.) | SECONDARY FIRING TEMPERATURE (° C.) | AMOUNT OF Ni TO BE MIXED |
|---|---|---|---|---|---|---|---|---|---|
| A-12 | a-12 | EMD (NEUTRALIZATION BY SODA) | 23.8 | −0.8 | 1.5 | 0.14 | 820 | 630 | 0 |
| B-4 | b-4 | EMD (NEUTRALIZATION BY SODA) | 18.1 | 0.2 | 1.4 | 0.14 | 650 | 650 | 0 |
| B-11 | b-11 | EMD (NEUTRALIZATION BY SODA) | 18.0 | 0.8 | 0.7 | 0.14 | 750 | 450 | 0 |
| D-4 | b-4 | EMD (NEUTRALIZATION BY SODA) | 18.1 | 0.2 | 1.4 | 0.14 | 650 | 650 | 20 |

TABLE 3

| BUTTERY ID | RAW MATERIAL ID | Mn RAW MATERIAL | RAW MATERIAL L* | RAW MATERIAL a* | RAW MATERIAL b* | xIN $Li_{1+x}Mn_{2-x}O_4$ | PRIMARY FIRING TEMPERATURE (° C.) | SECONDARY FIRING TEMPERATURE (° C.) | AMOUNT OF Ni TO BE MIXED |
|---|---|---|---|---|---|---|---|---|---|
| A-4 | a-4 | β-$MnO_2$ | 23.1 | 1.3 | 1.3 | 0.12 | 840 | 600 | 0 |
| A-5 | a-5 | β-$MnO_2$ | 23.0 | 0.5 | 1.5 | 0.14 | 870 | 600 | 0 |
| A-13 | a-13 | β-$MnO_2$ | 22.9 | 0.9 | 1.4 | 0.16 | 750 | 500 | 0 |
| B-5 | b-5 | β-$MnO_2$ | 27.6 | 5.7 | 11.8 | 0.10 | 870 | 600 | 0 |
| B-12 | b-12 | β-$MnO_2$ | 27.5 | 5.6 | 12.0 | 0.14 | 600 | 900 | 0 |
| B-13 | b-13 | β-$MnO_2$ | 27.6 | 5.8 | 11.9 | 0.16 | 600 | 870 | 0 |
| C-4 | a-4 | β-$MnO_2$ | 23.1 | 1.3 | 1.3 | 0.12 | 840 | 600 | 20 |
| D-5 | b-5 | β-$MnO_2$ | 27.6 | 5.7 | 11.8 | 0.10 | 870 | 600 | 20 |
| E-2 | a-4 | β-$MnO_2$ | 23.1 | 1.3 | 1.3 | 0.12 | 840 | 600 | 30 |
| E-3 | a-4 | β-$MnO_2$ | 23.1 | 1.3 | 1.3 | 0.12 | 840 | 600 | 40 |
| E-4 | a-4 | β-$MnO_2$ | 23.1 | 1.3 | 1.3 | 0.12 | 840 | 600 | 50 |
| E-5 | a-4 | β-$MnO_2$ | 23.1 | 1.3 | 1.3 | 0.12 | 840 | 600 | 60 |
| E-6 | a-4 | β-$MnO_2$ | 23.1 | 1.3 | 1.3 | 0.12 | 840 | 600 | 70 |

TABLE 3-continued

| BUTTERY ID | RAW MATERIAL ID | Mn RAW MATERIAL | RAW MATERIAL L* | RAW MATERIAL a* | RAW MATERIAL b* | xIN Li$_{1+x}$Mn$_{2-x}$O$_4$ | PRIMARY FIRING TEMPERATURE (° C.) | SECONDARY FIRING TEMPERATURE (° C.) | AMOUNT OF Ni TO BE MIXED |
|---|---|---|---|---|---|---|---|---|---|
| E-7 | a-4 | β-MnO$_2$ | 23.1 | 1.3 | 1.3 | 0.12 | 840 | 600 | 80 |
| E-8 | a-4 | β-MnO$_2$ | 23.1 | 1.3 | 1.3 | 0.12 | 840 | 600 | 90 |

TABLE 4

| BUTTERY ID | RAW MATERIAL ID | Mn RAW MATERIAL | RAW MATERIAL L* | RAW MATERIAL a* | RAW MATERIAL b* | xIN Li$_{1+x}$Mn$_{2-x}$O$_4$ | PRIMARY FIRING TEMPERATURE (° C.) | SECONDARY FIRING TEMPERATURE (° C.) | AMOUNT OF Ni TO BE MIXED |
|---|---|---|---|---|---|---|---|---|---|
| A-6 | a-6 | Mn$_2$O$_3$ | 22.5 | 0.8 | 1.7 | 0.16 | 750 | 550 | 0 |
| A-7 | a-7 | Mn$_2$O$_3$ | 22.4 | 1.9 | 1.2 | 0.18 | 750 | 500 | 0 |
| A-15 | a-15 | Mn$_2$O$_3$ | 22.4 | 1.5 | 1.3 | 0.18 | 780 | 780 | 0 |
| B-7 | b-7 | Mn$_2$O$_3$ | 37.0 | 11.0 | 22.3 | 0.18 | 700 | 550 | 0 |
| B-14 | b-14 | Mn$_2$O$_3$ | 37.2 | 10.9 | 22.2 | 0.16 | 550 | 650 | 0 |
| B-15 | b-15 | Mn$_2$O$_3$ | 37.1 | 11.0 | 22.4 | 0.18 | 400 | 600 | 0 |
| C-6 | a-6 | Mn$_2$O$_3$ | 22.5 | 0.8 | 1.7 | 0.16 | 750 | 550 | 20 |
| C-7 | a-7 | Mn$_2$O$_3$ | 22.4 | 1.9 | 1.2 | 0.18 | 750 | 500 | 20 |
| D-7 | b-7 | Mn$_2$O$_3$ | 37.0 | 11.0 | 22.3 | 0.18 | 700 | 550 | 20 |

TABLE 5

| BUTTERY ID | RAW MATERIAL ID | Mn RAW MATERIAL | RAW MATERIAL L* | RAW MATERIAL a* | RAW MATERIAL b* | xIN Li$_{1+x}$Mn$_{2-x}$O$_4$ | PRIMARY FIRING TEMPERATURE (° C.) | SECONDARY FIRING TEMPERATURE (° C.) | AMOUNT OF Ni TO BE MIXED |
|---|---|---|---|---|---|---|---|---|---|
| A-8 | a-8 | Mn$_3$O$_4$ | 25.3 | 17.3 | 6.1 | 0.18 | 820 | 500 | 0 |
| B-8 | b-8 | Mn$_3$O$_4$ | 25.7 | 17.6 | 6.9 | 0.20 | 700 | 450 | 0 |
| A-16 | a-16 | Mn$_3$O$_4$ | 25.4 | 17.4 | 5.9 | 0.18 | 780 | 480 | 0 |
| B-16 | b-16 | Mn$_3$O$_4$ | 25.4 | 17.5 | 6.4 | 0.18 | 450 | 500 | 0 |
| C-8 | a-8 | Mn$_3$O$_4$ | 25.3 | 17.3 | 6.1 | 0.18 | 820 | 500 | 20 |
| D-8 | b-8 | Mn$_3$O$_4$ | 25.7 | 17.6 | 6.9 | 0.20 | 700 | 450 | 20 |

TABLE 6

| BATTERY ID | RAW MATERIAL ID | AMOUNT OF Ni TO BE MIXED | LATTICE CONSTANT (Å) | PRODUCT L* | PRODUCT a* | PRODUCT b* | RATE OF A RISE IN THE RESISTANCE OF A BATTERY |
|---|---|---|---|---|---|---|---|
| A-2 | a-2 | 0 | 8.2034 | 24 | −2.4 | −4.8 | 1.62 |
| A-3 | a-3 | 0 | 8.1941 | 26 | −1.9 | −5.5 | 1.64 |
| A-11 | a-11 | 0 | 8.2002 | 24 | −2.1 | −5.5 | 1.59 |
| B-3 | b-3 | 0 | 8.2178 | 20 | −3.9 | −6.2 | 2.08 |
| B-9 | b-9 | 0 | 8.2179 | 21 | −3.4 | −6.2 | 2.28 |
| B-10 | b-10 | 0 | 8.2150 | 18 | 0.7 | −4.0 | 2.11 |
| C-2 | a-2 | 20 | 8.2034 | 24 | −2.4 | −4.8 | 1.34 |
| C-3 | a-3 | 20 | 8.1941 | 26 | −1.9 | −5.5 | 1.31 |
| D-3 | b-3 | 20 | 8.2178 | 20 | −3.9 | −6.2 | 2.09 |

TABLE 7

| BATTERY ID | RAW MATERIAL ID | AMOUNT OF Ni TO BE MIXED | LATTICE CONSTANT (Å) | PRODUCT L* | PRODUCT a* | PRODUCT b* | RATE OF A RISE IN THE RESISTANCE OF A BATTERY |
|---|---|---|---|---|---|---|---|
| A-12 | a-12 | 0 | 8.2011 | 27 | −1.9 | −5.4 | 1.61 |
| B-4 | b-4 | 0 | 8.2101 | 20 | −0.9 | −3.9 | 1.98 |
| B-11 | b-11 | 0 | 8.2177 | 21 | 0.2 | −3.9 | 2.00 |
| D-4 | b-4 | 20 | 8.2101 | 20 | −0.9 | −3.9 | 1.97 |

TABLE 8

| BATTERY ID | RAW MATERIAL ID | AMOUNT OF Ni TO BE MIXED | LATTICE CONSTANT (Å) | PRODUCT L* | PRODUCT a* | PRODUCT b* | RATE OF A RISE IN THE RESISTANCE OF A BATTERY |
|---|---|---|---|---|---|---|---|
| A-4  | a-4  | 0  | 8.2066 | 24 | −2.8 | −5.1 | 1.61 |
| A-5  | a-5  | 0  | 8.1998 | 20 | −1.4 | −5.7 | 1.72 |
| A-13 | a-13 | 0  | 8.1935 | 21 | −1.4 | −4.2 | 1.76 |
| B-5  | b-5  | 0  | 8.2242 | 21 | −3.9 | −4.0 | 2.21 |
| B-12 | b-12 | 0  | 8.2149 | 21 | −3.6 | −6.5 | 2.34 |
| B-13 | b-13 | 0  | 8.2081 | 20 | −1.0 | −6.3 | 2.22 |
| C-4  | a-4  | 20 | 8.2066 | 24 | −2.8 | −5.1 | 1.29 |
| D-5  | b-5  | 20 | 8.2242 | 21 | −3.9 | −4.0 | 2.20 |
| E-2  | a-4  | 30 | 8.2066 | 24 | −2.8 | −5.1 | 1.27 |
| E-3  | a-4  | 40 | 8.2066 | 24 | −2.8 | −5.1 | 1.21 |
| E-4  | a-4  | 50 | 8.2066 | 24 | −2.8 | −5.1 | 1.22 |
| E-5  | a-4  | 60 | 8.2066 | 24 | −2.8 | −5.1 | 1.33 |
| E-6  | a-4  | 70 | 8.2066 | 24 | −2.8 | −5.1 | 1.48 |
| E-7  | a-4  | 80 | 8.2066 | 24 | −2.8 | −5.1 | 1.65 |
| E-8  | a-4  | 90 | 8.2066 | 24 | −2.8 | −5.1 | 1.72 |

TABLE 9

| BATTERY ID | RAW MATERIAL ID | AMOUNT OF Ni TO BE MIXED | LATTICE CONSTANT (Å) | PRODUCT L* | PRODUCT a* | PRODUCT b* | RATE OF A RISE IN THE RESISTANCE OF A BATTERY |
|---|---|---|---|---|---|---|---|
| A-6  | a-6  | 0  | 8.1954 | 27 | −2.5 | −4.9 | 1.63 |
| A-7  | a-7  | 0  | 8.1878 | 25 | −2.2 | −5.3 | 1.59 |
| A-15 | a-15 | 0  | 8.1889 | 26 | −2.4 | −4.9 | 1.61 |
| B-7  | b-7  | 0  | 8.1951 | 19 | 0.7  | −3.8 | 1.97 |
| B-14 | b-14 | 0  | 8.2096 | 21 | 0.2  | −3.8 | 1.98 |
| B-15 | b-15 | 0  | 8.2004 | 18 | −0.1 | −3.5 | 1.99 |
| C-6  | a-6  | 20 | 8.1954 | 27 | −2.5 | −4.9 | 1.31 |
| C-7  | a-7  | 20 | 8.1878 | 25 | −2.2 | −5.3 | 1.28 |
| D-7  | b-7  | 20 | 8.1951 | 19 | 0.7  | −3.8 | 1.99 |

TABLE 10

| BATTERY ID | RAW MATERIAL ID | AMOUNT OF Ni TO BE MIXED | LATTICE CONSTANT (Å) | PRODUCT L* | PRODUCT a* | PRODUCT b* | RATE OF A RISE IN THE RESISTANCE OF A BATTERY |
|---|---|---|---|---|---|---|---|
| A-8  | a-8  | 0  | 8.1891 | 26 | −1.8 | −5.6 | 1.62 |
| B-8  | b-8  | 0  | 8.1897 | 21 | 1.1  | −3.5 | 2.11 |
| A-16 | a-16 | 0  | 8.19   | 26 | −2.7 | −4.5 | 1.6  |
| B-16 | b-16 | 0  | 8.1985 | 20 | 0.9  | −3.4 | 2.17 |
| C-8  | a-8  | 20 | 8.1891 | 26 | −1.8 | −5.6 | 1.3  |
| D-8  | b-8  | 20 | 8.1897 | 21 | 1.1  | −3.5 | 2.08 |

The invention claimed is:

1. A positive electrode active material for a secondary battery, comprising:
   a spinel structure that allows electrochemical insertion and extraction of lithium and contains lithium manganate in which the value of a* of the L*a*b* color specification system is $-3.2 \leq a^* \leq -1.4$; and
   a compound represented by the following formula (2):

$$LiNi_{1-y}M_yO_2 \quad (2)$$

wherein M is one or two or more materials selected from the group consisting of Co, Mn and Al and y satisfies the following condition: $0.1 < y < 0.5$.

2. A positive electrode active material for a secondary battery according to claim 1, wherein the value of b* of the L*a*b* color specification system is $-5.8 \leq b^* \leq -4.2$.

3. A positive electrode active material for a secondary battery which has a spinel structure that allows electrochemical insertion and extraction of lithium and contains lithium manganate in which the value of b* of the L*a*b* color specification system is $-5.8 \leq b^* \leq -4.2$.

4. A positive electrode active material for a secondary battery according to claim 1, wherein the value of L* of the L*a*b* color specification system is $24 \leq L^* \leq 27$.

5. A positive electrode active material for a secondary battery which has a spinel structure that allows electrochemical insertion and extraction of lithium and contains lithium manganate in which the value of L* of the L*a*b* color specification system is $24 \leq L^* \leq 27$.

6. A positive electrode active material for a secondary battery comprising: a spinel structure that allows electrochemical insertion and extraction of lithium and contains lithium manganate in which the value of a* of the L*a*b* color specification system is $-3.2 \leq a^* \leq -1.4$; and
   said lithium manganate is a compound represented by the following formula (1) or has a structure in which a part of the sites where Mn or O is present are substituted with other elements:

$$Li_{1+x}Mn_{2-}O_4 \quad (1)$$

wherein x satisfies the following condition: $0.12 \leq x \leq 0.18$.

7. A positive electrode active material for a secondary battery according to claim 1, wherein α is 20 or more and 70 or less, when the ratio by weight of said lithium manganate to compound represented by the above formula (2) is (100−α):α.

8. A secondary battery comprising at least a positive electrode and a negative electrode, comprising said positive electrode active material for a secondary battery as claimed in claim 1.

9. A process of manufacturing the positive electrode active material for a secondary battery as claimed in claim 1, comprising:

mixing a Mn raw material and a Li raw material and by primarily firing and secondarily firing the mixture to obtain lithium manganate, wherein;

the value of L* of the L*a*b* color specification system of Mn raw material is $22 \leq L^* \leq 26$; and primary firing and secondary firing are carried out at temperatures of 450 degree C. or more and 950 degree C. or less.

10. A process for manufacturing said positive electrode active material for a secondary battery as claimed in claim 1, comprising:

mixing a Mn raw material and a Li raw material and primarily firing and secondarily firing the mixture to obtain lithium manganate, wherein;

the value of a* of the L*a*b* color specification system of Mn raw material is $-1 \leq a^* \leq 2$; and primary firing and secondary firing are carried out at temperatures of 450 degree C. or more and 950 degree C. or less.

11. A process of manufacturing said positive electrode active material for a secondary battery as claimed in claim 1, comprising:

mixing a Mn raw material and a Li raw material and primarily firing and secondarily firing the mixture to obtain lithium manganate, wherein;

the value of b* of the L*a*b* color specification system of Mn raw material is $0 \leq b^* \leq 10$; and primary firing and secondary firing are carried out at temperatures of 450 degree C or more and 950 degree C or less and secondary firing is carried out at a lower temperature than primary firing.

* * * * *